United States Patent
Honuchi et al.

(10) Patent No.: US 10,751,880 B2
(45) Date of Patent: Aug. 25, 2020

(54) DATA STORAGE DEVICE, ROBOT SYSTEM, AND DATA STORAGE METHOD

(71) Applicant: Panasonic Intellectual Property Management Co., Ltd., Osaka (JP)

(72) Inventors: Yasuyoshi Honuchi, Osaka (JP); Hiroyuki Nakata, Osaka (JP); Atsumi Hashimoto, Osaka (JP); Ryosuke Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 291 days.

(21) Appl. No.: 16/069,900

(22) PCT Filed: Mar. 17, 2017

(86) PCT No.: PCT/JP2017/010900
§ 371 (c)(1),
(2) Date: Jul. 13, 2018

(87) PCT Pub. No.: WO2017/169898
PCT Pub. Date: Oct. 5, 2017

(65) Prior Publication Data
US 2019/0022865 A1 Jan. 24, 2019

(30) Foreign Application Priority Data
Mar. 30, 2016 (JP) .................... 2016-067192

(51) Int. Cl.
*G06F 17/00* (2019.01)
*B25J 9/16* (2006.01)
(Continued)

(52) U.S. Cl.
CPC ........... *B25J 9/1674* (2013.01); *B25J 9/0009* (2013.01); *B25J 19/06* (2013.01)

(58) Field of Classification Search
CPC ......... B25J 9/1674; B25J 9/0009; B25J 19/06
(Continued)

(56) References Cited

U.S. PATENT DOCUMENTS

| 2005/0017602 A1* | 1/2005 | Arms | G01L 3/108 |
| | | | 310/339 |
| 2005/0188267 A1* | 8/2005 | Farchmin | G05B 23/027 |
| | | | 714/35 |

(Continued)

FOREIGN PATENT DOCUMENTS

| EP | 1 353 252 | 10/2003 |
| JP | 6-036050 | 2/1994 |

(Continued)

OTHER PUBLICATIONS

International Search Report of PCT application No. PCT/JP2017/010900 dated May 9, 2017.
(Continued)

*Primary Examiner* — Ronnie M Mancho
(74) *Attorney, Agent, or Firm* — Wenderoth, Lind & Ponack, L.L.P.

(57) ABSTRACT

A first acquisition unit acquires first data on first malfunction of a robot. A second acquisition unit acquires second data on second malfunction of the robot. A first determination unit determines whether or not to store the first data in accordance with the first data. A second determination unit determines whether or not to store the second data in accordance with the second data. A memory stores the first data and the second data. A controller stores the first data in the memory at a first period when the first determination unit determines to store the first data. The controller further stores the second data in the memory at a second period longer than the first period, when the first determination unit
(Continued)

determines not to store the first data and the second determination unit determines to store the second data.

7 Claims, 12 Drawing Sheets

(51) Int. Cl.
*B25J 19/06* (2006.01)
*B25J 9/00* (2006.01)

(58) Field of Classification Search
USPC .......................................................... 700/250
See application file for complete search history.

(56) References Cited

U.S. PATENT DOCUMENTS

| | | | | |
|---|---|---|---|---|
| 2006/0025897 | A1* | 2/2006 | Shostak | G08G 1/017 |
| | | | | 701/1 |
| 2006/0208169 | A1* | 9/2006 | Breed | G06K 9/00624 |
| | | | | 250/221 |
| 2007/0043585 | A1* | 2/2007 | Matos | G16H 40/63 |
| | | | | 705/2 |
| 2010/0036269 | A1* | 2/2010 | Ferren | A61B 5/412 |
| | | | | 600/504 |
| 2011/0046775 | A1* | 2/2011 | Bailey | B07C 3/02 |
| | | | | 700/224 |
| 2012/0296579 | A1* | 11/2012 | Poling | G06Q 10/06 |
| | | | | 702/50 |
| 2013/0050121 | A1* | 2/2013 | Bruemmer | B25J 9/1666 |
| | | | | 345/173 |
| 2013/0345718 | A1* | 12/2013 | Crawford | A61B 34/10 |
| | | | | 606/130 |
| 2014/0018792 | A1* | 1/2014 | Gang | A61B 34/73 |
| | | | | 606/41 |
| 2016/0029998 | A1* | 2/2016 | Brister | A61B 5/6853 |
| | | | | 600/424 |
| 2016/0045841 | A1* | 2/2016 | Kaplan | C10G 1/02 |
| | | | | 429/49 |
| 2016/0375592 | A1* | 12/2016 | Szatmary | B25J 11/0085 |
| | | | | 700/255 |
| 2017/0296179 | A1* | 10/2017 | Shelton, IV | A61B 5/053 |

FOREIGN PATENT DOCUMENTS

| | | |
|---|---|---|
| JP | 9-311715 | 12/1997 |
| JP | 2005-044192 | 2/2005 |
| JP | 2005-103681 | 4/2005 |
| JP | 2008-203962 | 9/2008 |

OTHER PUBLICATIONS

Extended European Search Report dated Mar. 15, 2019 in related European Patent Application No. 17774439.8.

* cited by examiner

FIG. 8

| Address | Sampling data | |
|---|---|---|
| 0 | Data A1 | d10 |
| 1 | Data A2 | |
| ⋮ | ⋮ | |
| (n1-1) | Data An1 | |
| n1×1+0 | Data A1 | d11 |
| n1×1+1 | Data A2 | |
| ⋮ | ⋮ | |
| n1×1+(n1-1) | Data An1 | |

FIG. 9

| Address | Sampling data | |
|---|---|---|
| 0 | Data B1 | d12 |
| 1 | Data B2 | |
| ⋮ | ⋮ | |
| (n2-1) | Data Bn2 | |
| n2×1+0 | Data B1 | d13 |
| n2×1+1 | Data B2 | |
| ⋮ | ⋮ | |
| n2×1+(n2-1) | Data Bn2 | |
| n2×2+0 | Data B1 | d14 |
| n2×2+1 | Data B2 | |
| ⋮ | ⋮ | |
| n2×2+(n2-1) | Data Bn2 | |

FIG. 10

| Address | Sampling data | |
|---|---|---|
| 0 | Data C1 | d15 |
| 1 | Data C2 | |
| ⋮ | ⋮ | |
| (n3-1) | Data Cn3 | |
| n3×1+0 | Data C1 | d16 |
| n3×1+1 | Data C2 | |
| ⋮ | ⋮ | |
| n3×1+(n3-1) | Data Cn3 | |
| n3×2+0 | Data C1 | d17 |
| n3×2+1 | Data C2 | |
| ⋮ | ⋮ | |
| n3×2+(n3-1) | Data Cn3 | |
| n3×3+0 | Data C1 | d18 |
| n3×3+1 | Data C2 | |
| ⋮ | ⋮ | |
| n3×3+(n3-1) | Data Cn3 | |

| Address | Sampling data |
|---------|---------------|
| 1 | T1 |
| 2 | T2 |
| 3 | T3 |
| . | . |
| . | . |
| i | Ti |
| . | . |
| . | . |
| n | Tn |

910

DATA STORAGE DEVICE, ROBOT SYSTEM, AND DATA STORAGE METHOD

This application is a U.S. national stage application of the PCT International Application No. PCT/JP2017/010900 filed on Mar. 17, 2017, which claims the benefit of foreign priority of Japanese patent application 2016-067192 filed on Mar. 30, 2016, the contents all of which are incorporated herein by reference.

TECHNICAL FIELD

The present disclosure relates to a data storage device, a robot system, and a data storage method.

BACKGROUND ART

PTL 1 discloses a method of displaying a robot malfunction occurrence history. A conventional method of displaying a robot malfunction occurrence history will be described with reference to FIG. 11, FIG. 12, and FIG. 13. FIG. 11 is a schematic flowchart of conventional sampling data memorization. FIG. 12 is a conceptual chart depicting a configuration of a conventional data memory file. FIG. 13 is an exemplary graph of conventional data display.

As depicted in FIG. 11, the conventional sampling data memorization includes step S901 to step S909.

Step S901 includes determining whether or not malfunction detection flag F has an initial value of "zero". If malfunction detection flag F is not "zero", an alarm is occurring. The sampling data memorization accordingly ends. If malfunction detection flag F is "zero", the flow proceeds to subsequent step S902.

Step S902 includes reading a torque command current value. The flow then proceeds to subsequent step S903.

Step S903 includes adding one to address search index i. Address search index i has an initial value of "zero". The flow then proceeds to subsequent step S904.

Step S904 includes determining whether or not address search index i obtained after the addition of one exceeds n. The flow proceeds to step S906 if address search index i does not exceed n. If address search index i exceeds n, address search index i is set to "one" (step S905). The flow then proceeds to step S906.

In step S906, the torque command current value read in step S902 is memorized as sampling data corresponding to address search index i in the data memory file. The flow then proceeds to subsequent step S907.

In step S907, address search index i is memorized in final record address memory register Pe. The flow then proceeds to subsequent step S908.

Step S908 includes determining whether or not an alarm is occurring. If an alarm is occurring, malfunction detection flag F is set to "one" (step S909). The sampling data memorization then ends. If no alarm is occurring, the sampling data memorization ends without including step S909.

The sampling data memorization (step S901 to step S909) is repeated at predetermined period $\Delta t$ to generate data memory file 910 as indicated in FIG. 12. As in FIG. 12, data memory file 910 includes torque command sampling data of which number is limited to address number n. The oldest sampling data is updated with the latest sampling data.

A torque command before alarm occurrence by time corresponding to $n \cdot \Delta t$ can be indicated in accordance with data memory file 910, as in the graph of FIG. 13 having a transverse axis for time t and an ordinate axis for tor torque command T.

PTL 2 and PTL 3 also refer to storing sampling data in case of alarm occurrence.

CITATION LIST

Patent Literatures

PTL 1: Unexamined Japanese Patent Publication No. 9-311715

PTL 2: Unexamined Japanese Patent Publication No. 2005-103681

PTL 3: Unexamined Japanese Patent Publication No. 2008-203962

SUMMARY OF THE INVENTION

The conventional method of displaying a robot malfunction occurrence history includes storing sampling data at a preset sampling period and at preset sampling time. It is desired to store sufficient sampling data on a plurality of robot malfunctions. There is, however, a limit in capacity of a memory storing sampling data. The data stored through sampling is thus constant in volume. It is accordingly difficult to store all necessary data on a plurality of malfunctions. The present disclosure provides a data storage device configured to efficiently store data on a plurality of robot malfunctions even with a limit in memory capacity.

The present disclosure provides a data storage device configured to store data on malfunction of a robot and including a first acquisition unit, a second acquisition unit, a first determination unit, a second determination unit, a memory, and a controller. The first acquisition unit acquires first data on first malfunction of the robot. The second acquisition unit acquires second data on second malfunction of the robot. The first determination unit determines whether or not to store the first data in accordance with the first data. The second determination unit determines whether or not to store the second data in accordance with the second data. The memory stores the first data and the second data. The controller stores the first data in the memory at a first period when the first determination unit determines to store the first data. The controller stores the second data in the memory at a second period longer than the first period, when the first determination unit determines not to store the first data and the second determination unit determines to store the second data.

The present disclosure further provides a robot system including the data storage device, the robot, and a robot control device. The robot includes a drive unit. The robot control device controls the drive unit.

The present disclosure also provides a data storage method of storing data on malfunction of a robot, the method including: acquiring first data on first malfunction of the robot; acquiring second data on second malfunction of the robot; determining whether or not to store the first data in accordance with the first data; determining whether or not to store the second data in accordance with the second data; and storing the first data at a first period upon determination to store the first data, and storing the second data at a second period longer than the first period, upon determination not to store the first data and determination to store the second data.

The data storage device according to the present disclosure is configured to efficiently store data on a plurality of robot malfunctions even with a limit in memory capacity. The data storage device thus enables more accurate robot malfunction analysis.

BRIEF DESCRIPTION OF DRAWINGS

FIG. 8 is a chart of exemplary sampling data stored during overload detection.

FIG. 9 is a chart of exemplary sampling data stored during locked state detection.

FIG. 10 is a chart of exemplary sampling data stored during error counter excess detection.

DESCRIPTION OF EMBODIMENT

Exemplary Embodiment

An exemplary embodiment of the present disclosure will now be described with reference to FIG. 1 to FIG. 10.

Figure 1:
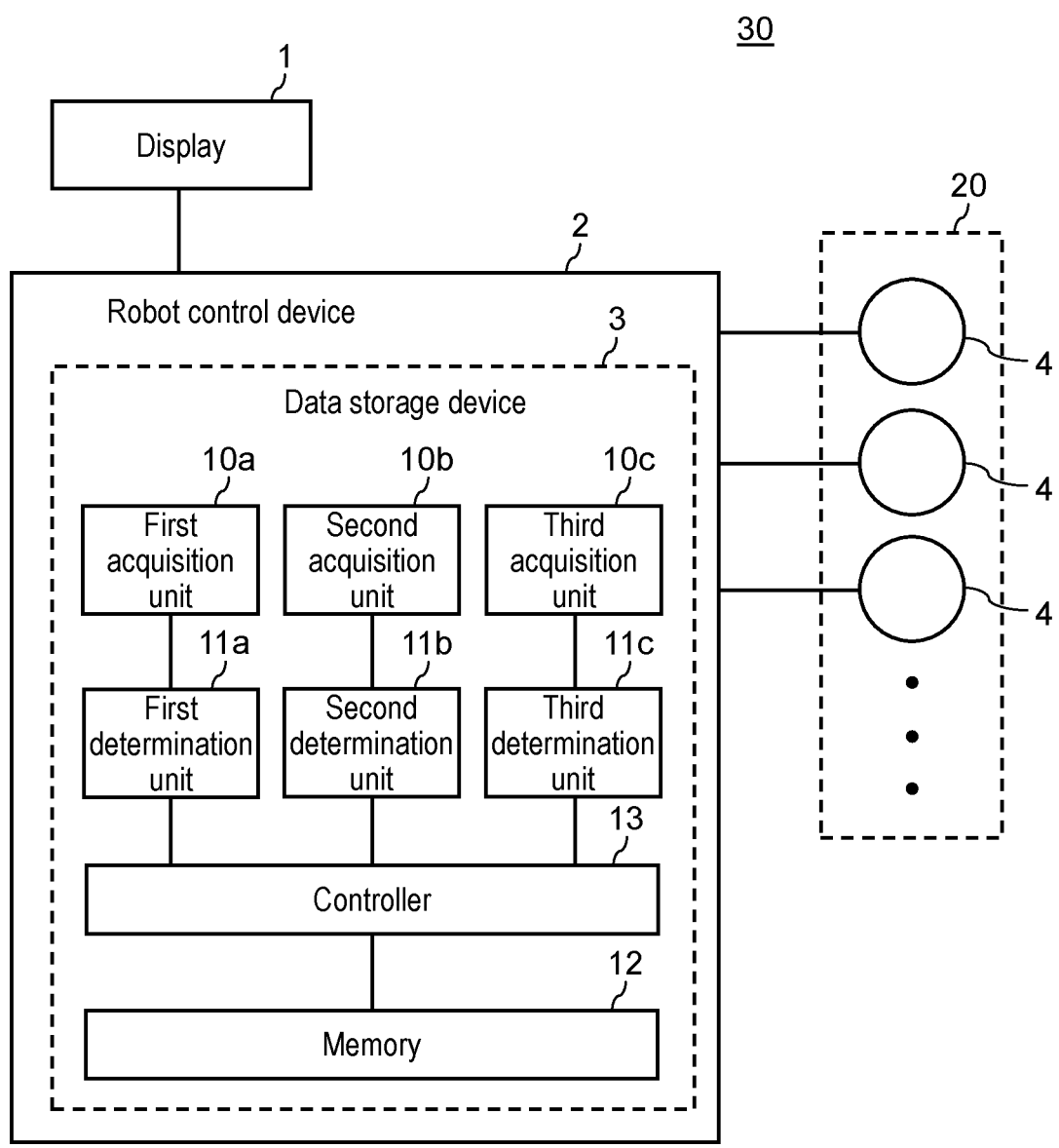
FIG. 1 is a block diagram of a robot system according to an exemplary embodiment.

FIG. 1 is a block diagram of robot system 30 according to the present exemplary embodiment. Robot system 30 includes display 1, robot control device 2, data storage device 3, and robot 20. Robot 20 according to the present exemplary embodiment is an industrial articulated robot. Robot 20 includes a plurality of servomotors 4 configured to drive external shafts such as joints and positioners of robot 20. Each of servomotors 4 exemplifies a drive unit of robot 20.

Robot control device 2 controls servomotors 4. Data storage device 3 is configured to store data on malfunction of robot 20, and includes first acquisition unit 10a, second acquisition unit 10b, third acquisition unit 10c, first determination unit 11a, second determination unit 11b, third determination unit 11c, memory 12, and controller 13. Display 1 is configured to display data on malfunction of robot 20 stored in memory 12. Robot control device 2 is further configured to stop servomotors 4 in accordance with the data on malfunction of robot 20 stored in memory 12. Robot control device 2 according to the present exemplary embodiment includes data storage device 3. The present disclosure is, however, not limited to this configuration. The present disclosure is also applicable to a configuration in which robot control device 2 does not include data storage device 3 and robot system 30 includes both robot control device 2 and data storage device 3.

Examples of display 1 include a liquid crystal display. Examples of memory 12 include a hard disk drive. The examples of memory 12 also include a solid state drive. Memory 12 functions as a data buffer.

Data storage device 3 executes sampling mode setting and sampling condition setting for data on malfunction of robot 20. Data storage device 3 stores sampling data as data on malfunction of robot 20. Data storage device 3 will be described below in terms of these operations with reference to FIG. 2 to FIG. 6.

Figure 2:
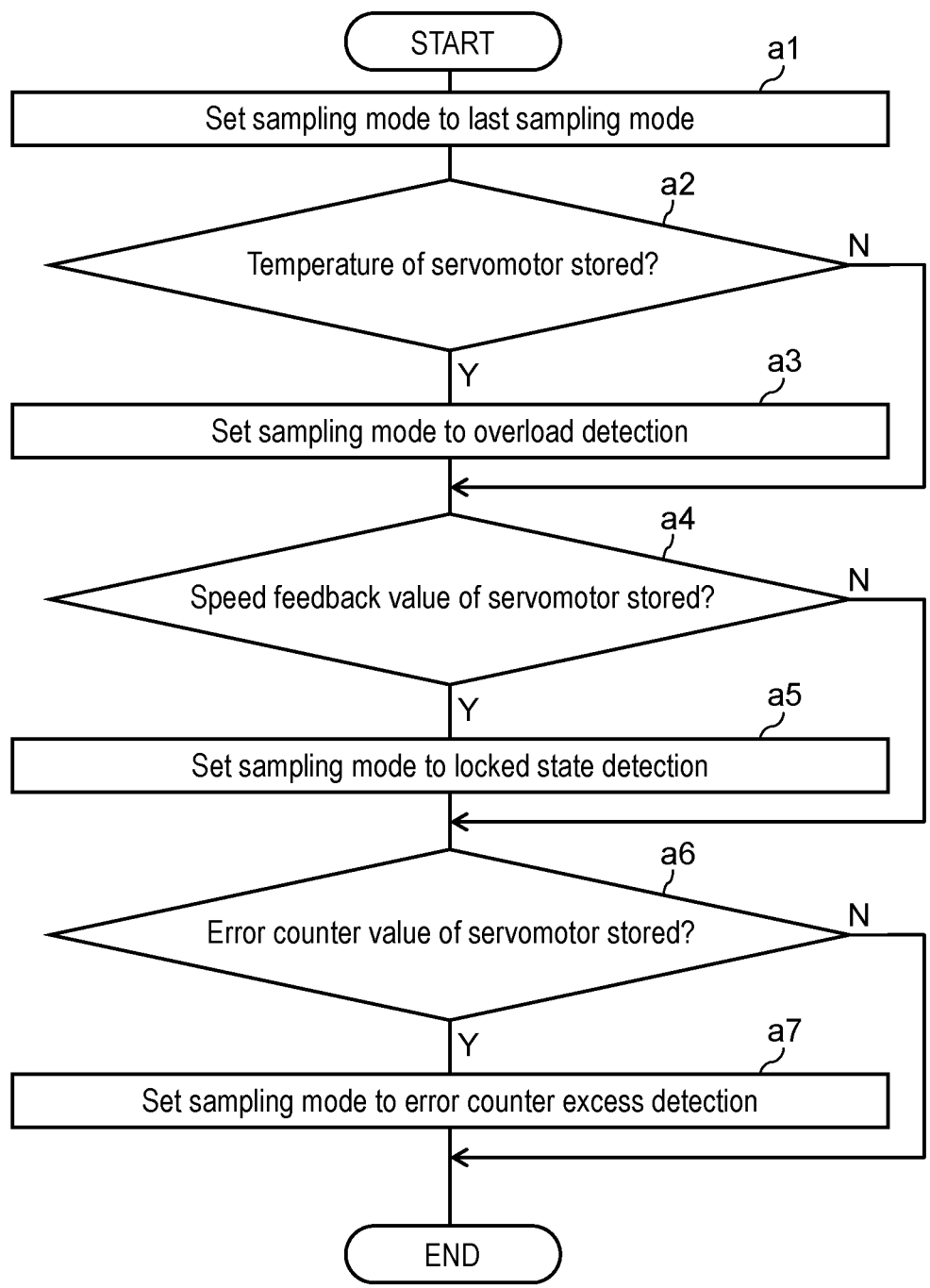
FIG. 2 is an explanatory flowchart of sampling mode setting.

The sampling mode setting will be described with reference to FIG. 2. FIG. 2 is an explanatory flowchart of the sampling mode setting.

Controller 13 sets a last sampling mode as a current sampling mode (step a1).

Third acquisition unit 10c acquires, from each servomotor 4, temperature of servomotor 4 as third data on third malfunction of servomotor 4. The third malfunction of servomotor 4 relates to an overload of servomotor 4. Third determination unit 11c determines whether or not to store the temperature of servomotor 4 as the third data in accordance with the temperature of servomotor 4. Specifically, third determination unit 11c determines whether or not to store the temperature of servomotor 4 as the third data through determining whether or not the temperature of servomotor 4 is equal to or more than predetermined temperature (step a2). If third determination unit 11c determines to store the temperature of servomotor 4 (Y in step a2), controller 13 sets the sampling mode to overload detection (step a3). If third determination unit 11c determines not to store the temperature of servomotor 4 (N in step a2), the flow proceeds to step a4.

Subsequently, second acquisition unit 10b acquires, from servomotor 4, a speed feedback value of servomotor 4 as second data on second malfunction of servomotor 4. The second malfunction of servomotor 4 relates to a locked state of servomotor 4. Second determination unit 11b determines whether or not to store the speed feedback value of servomotor 4 as the second data in accordance with the speed feedback value of servomotor 4. Specifically, second determination unit 11b calculates locked state time from the speed feedback value of the servomotor. Second determination unit 11b then determines whether or not to store the speed feedback value of servomotor 4 as the second data through determining whether or not the locked state time of servomotor 4 is equal to or more than predetermined time (step a4). If second determination unit 11b determines to store the speed feedback value of servomotor 4 (Y in step a4), controller 13 sets the sampling mode to locked state detection (step a5). If second determination unit 11b determines not to store the speed feedback value of servomotor 4 (N in step a4), the flow proceeds to step a6.

Subsequently, first acquisition unit 10a acquires, from servomotor 4, an error counter value of servomotor 4 as first data on first malfunction of servomotor 4. The first malfunction of servomotor 4 relates to error counter excess of servomotor 4. First determination unit 11a determines whether or not to store the error counter value of servomotor 4 as the first data in accordance with the error counter value of servomotor 4. Specifically, first determination unit 11a determines whether or not to store the error counter value of servomotor 4 as the first data through determining whether or not the error counter value of the servomotor is equal to or more than a predetermined value (step a6). If first determination unit 11a determines to store the error counter value of servomotor 4 (Y in step a6), controller 13 sets the sampling mode to error counter excess detection (step a7).

If first determination unit 11a determines not to store the error counter value of servomotor 4 (N in step a6), the sampling mode setting ends.

As described above, when first determination unit 11a determines to store the error counter value, controller 13 sets the sampling mode to error counter excess detection. When first determination unit 11a determines not to store the error counter value and second determination unit 11b determines to store the speed feedback value, controller 13 sets the sampling mode to locked state detection. When first determination unit 11a determines not to store the error counter value, second determination unit 11b determines not to store the speed feedback value, and third determination unit 11c determines to store the temperature of servomotor 4, controller 13 sets the sampling mode to overload detection.

The sampling modes are determined in an order of longer sampling periods of the respective sampling modes. Specifically, a sampling mode having a shorter sampling period is set preferentially. Specifically, the overload detection has the longest sampling period, the locked state detection has the second longest period, and the error counter excess detection has the shortest sampling period. These sampling periods correspond to urgency degrees upon alarm occurrence in these sampling modes.

Figure 3:
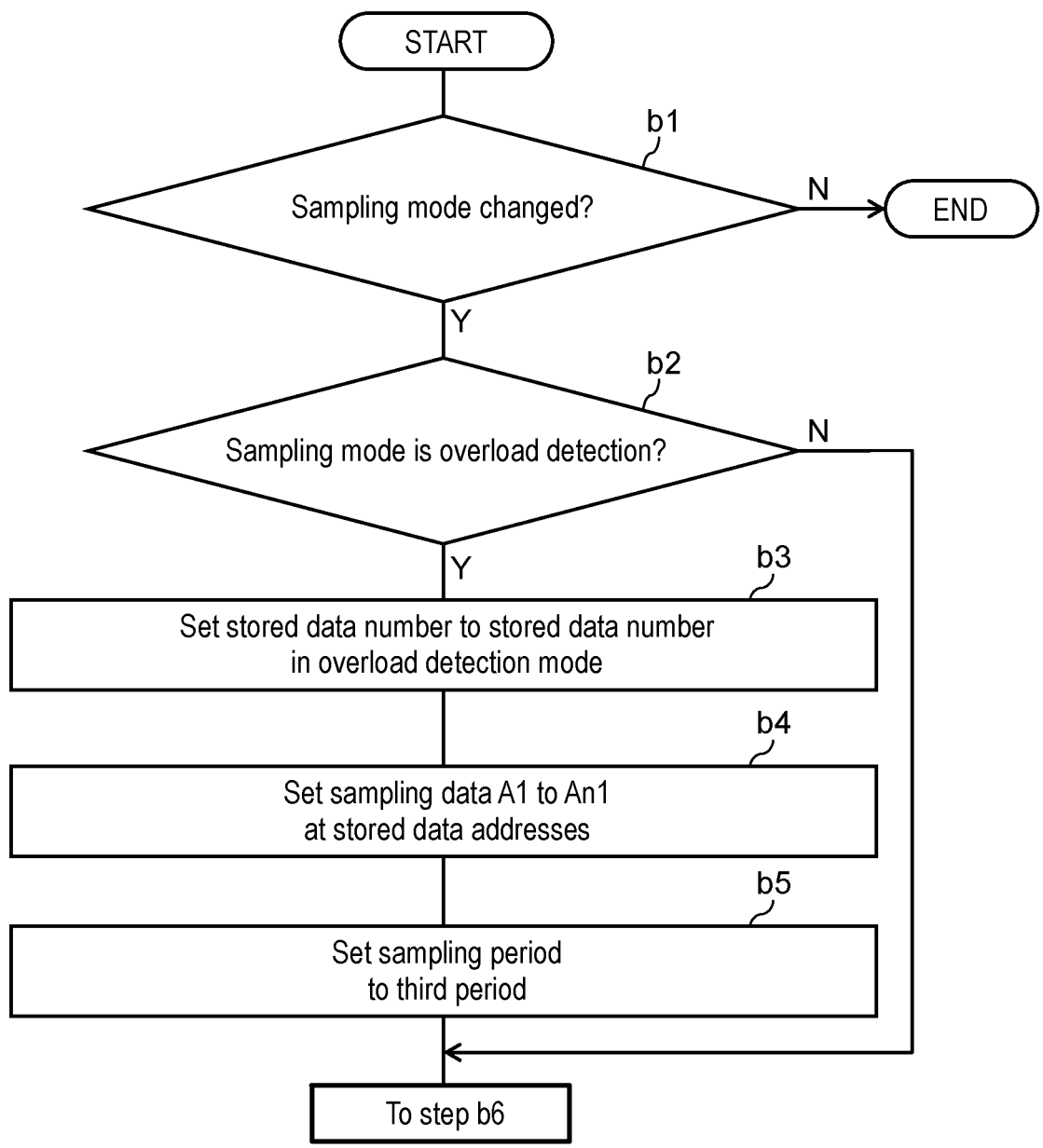
FIG. 3 depicts a first part of an explanatory flowchart of sampling condition setting.
Figure 4:
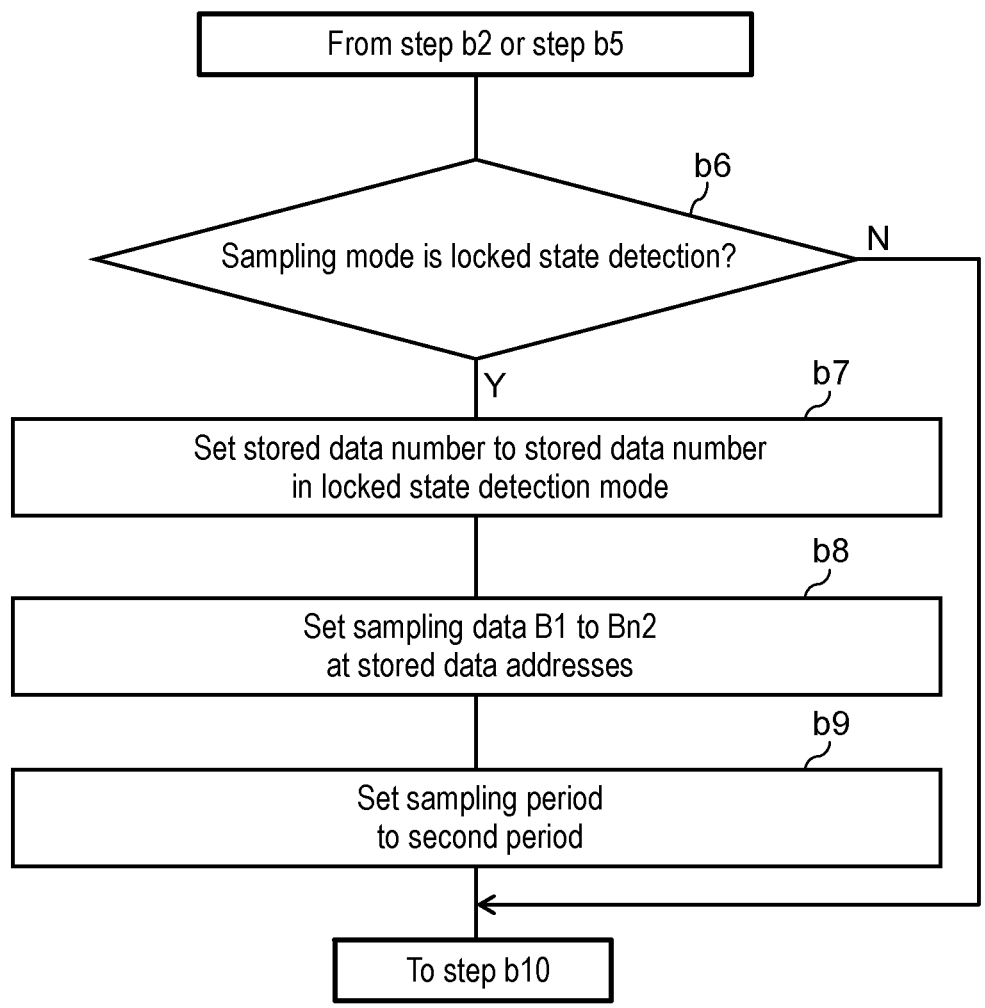
FIG. 4 depicts a second part of the explanatory flowchart of sampling condition setting.
Figure 5:
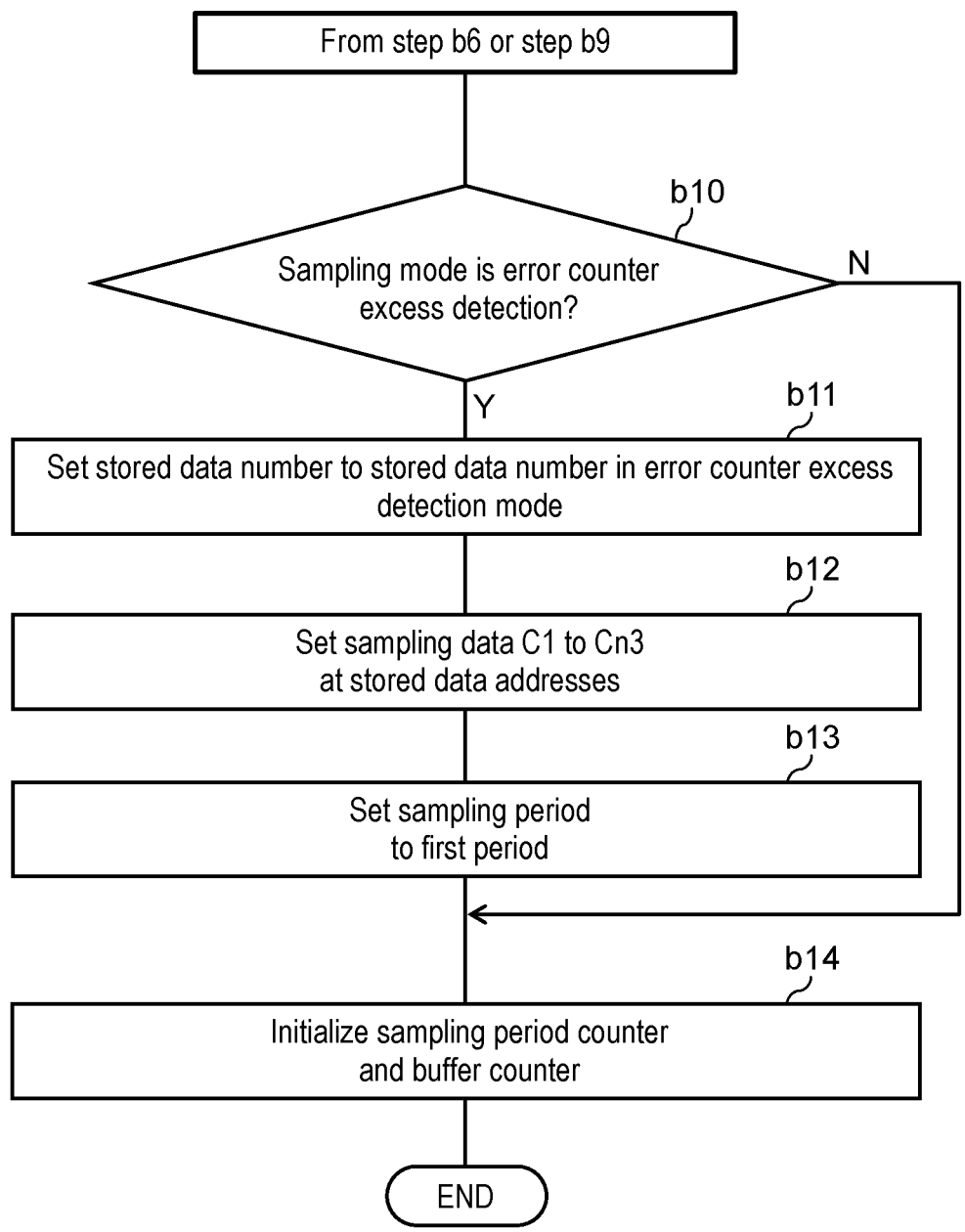
FIG. 5 depicts a third part of the explanatory flowchart of sampling condition setting.

The sampling condition setting will be described with reference to FIG. 3 to FIG. 5. FIG. 3 to FIG. 5 are explanatory flowcharts of the sampling condition setting.

As depicted in FIG. 3, controller 13 determines whether or not the current sampling mode changes from the last sampling mode (step b1). If the sampling mode does not change (N in step b1), controller 13 ends the processing. If the sampling mode changes (Y in step b1), controller 13 determines whether or not the sampling mode is the overload detection (step b2). If the sampling mode is not the overload detection (N in step b2), the flow proceeds to subsequent determination (step b6). If the sampling mode is the overload detection (Y in step b2), controller 13 executes the following setting. Controller 13 sets stored data number Ns to stored data number n1 for the mode of overload detection (step b3). Controller 13 then sets sampling data A1 to An1 at stored data addresses (step b4). Sampling data A1 to An1 include the temperature of servomotor 4. Sampling data A1 to An1 can further include the speed feedback value of servomotor 4. Sampling data A1 to An1 can still further include a total calorific value of servomotor 4. Controller 13 then sets sampling period Ts to third period t3 (step b5).

As depicted in FIG. 4, controller 13 subsequently determines whether or not the current sampling mode is the locked state detection (step b6). If the sampling mode is not the locked state detection (N in step b6), the flow proceeds to subsequent determination (step b10). If the sampling mode is the locked state detection (Y in step b6), controller 13 executes the following setting. Controller 13 sets stored data number Ns to stored data number n2 for the mode of locked state detection (step b7). Controller 13 then sets sampling data B1 to Bn2 at the stored data addresses (step b8). Sampling data B1 to Bn2 include the speed feedback value of servomotor 4. Sampling data B1 to Bn2 can further include a current command of servomotor 4. Controller 13 then sets sampling period Ts to second period t2 (step b9). Second period t2 is shorter than third period t3.

As depicted in FIG. 5, controller 13 subsequently determines whether or not the current sampling mode is the error counter excess detection (step b10). If the sampling mode is not the error counter excess detection (N in step b10), the flow proceeds to subsequent processing (step b14). If the sampling mode is the error counter excess detection (Y in step b10), controller 13 executes the following setting. Controller 13 sets stored data number Ns to stored data number n3 for the mode of error counter excess detection (step b11). Controller 13 then sets sampling data C1 to Cn3 at the stored data addresses (step b12). Sampling data C1 to Cn3 include the error counter value of servomotor 4. Sampling data C1 to Cn3 can further include a position feedback value of servomotor 4. Controller 13 then sets sampling period Ts to first period t1 (step b13). First period t1 is shorter than second period t2.

Controller 13 subsequently initializes (clears to zero) sampling period counter CNTs and buffer counter Wp (step b14). In other words, controller 13 sets sampling period counter CNTs and buffer counter Wp to "zero". Controller 13 can optionally store sampling data A1 to An1, B1 to Bn2, and C1 to Cn3 tentatively in a random access memory during the above operations.

Figure 6:
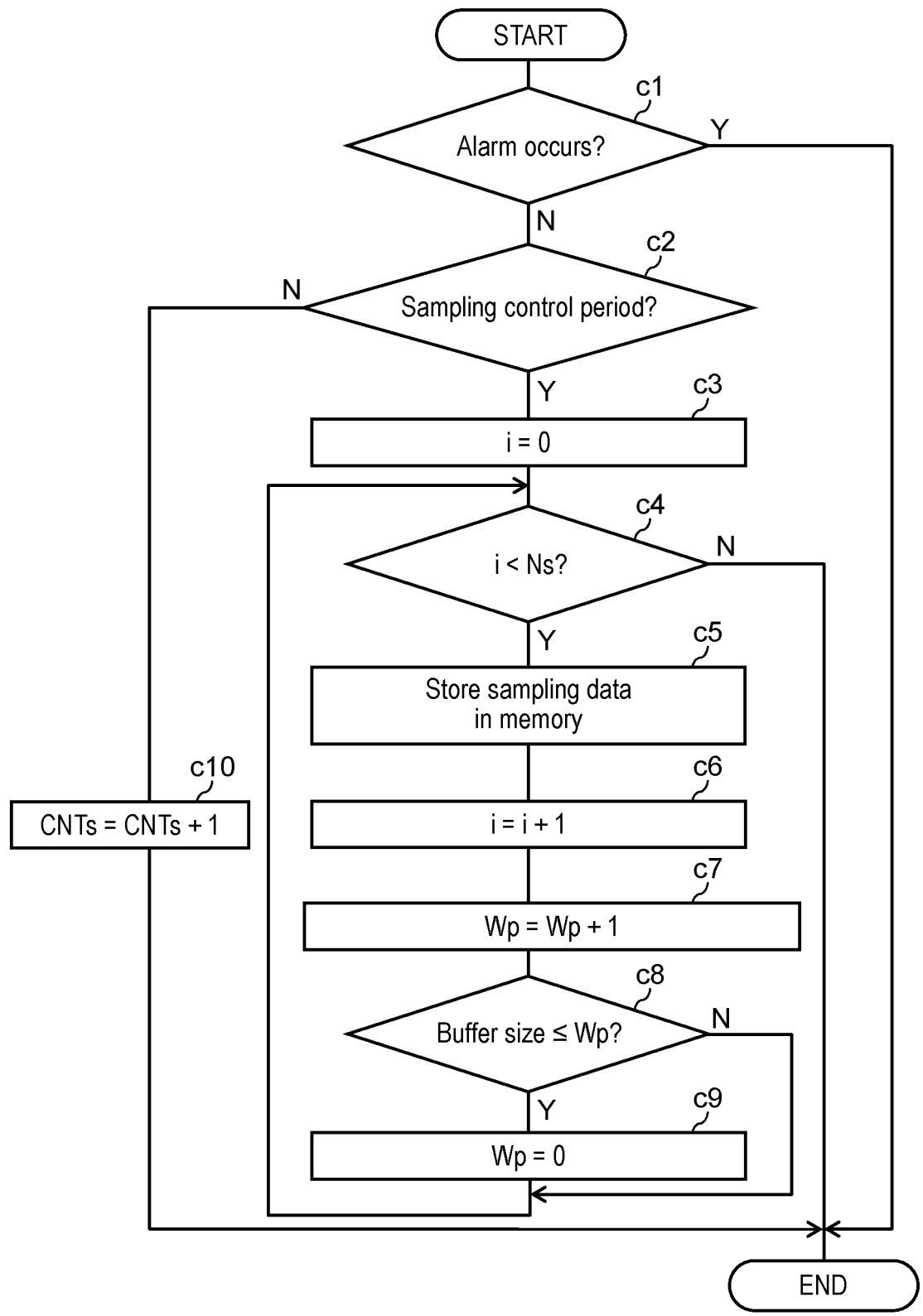
FIG. 6 is an explanatory flowchart of sampling data storage.

Sampling data storage will be described with reference to FIG. 6. FIG. 6 is an explanatory flowchart of the sampling data storage. Controller 13 determines whether or not an alarm is occurring (step c1). If an alarm is occurring (Y in step c1), controller 13 ends the processing. If no alarm is occurring (N in step c1), controller 13 determines whether or not a current control period is a sampling control period (step c2). Specifically, controller 13 determines whether or not the current control period is the sampling control period through comparing sampling period counter CNTs with sampling period Ts. If the current control period is not the sampling control period (N in step c2), controller 13 adds one to sampling period counter CNTs (step c10) and ends the processing. If the current control period is the sampling control period (Y in step c2), controller 13 initializes (clears to zero) stored data counter i (step c3). Controller 13 subsequently compares stored data number Ns with stored data counter i (step c4). If stored data counter i is equal to or more than stored data number Ns (N in step c4), controller 13 ends the processing. If stored data counter i is less than stored data number Ns (Y in step c4), controller 13 stores sampling data in memory 12. Specifically, controller 13 writes sampling data corresponding to stored data counter i at an address of memory 12 corresponding to buffer counter Wp (step c5). Controller 13 then adds one to stored data counter i (step c6), and adds one to buffer counter Wp (step c7). Controller 13 subsequently determines whether or not buffer counter Wp is equal to or more than a predetermined buffer size (step c8). If buffer counter WP is equal to or more than the buffer size (Y in step c8), controller 13 initializes (clears to zero) buffer counter Wp (step C9). The oldest sampling data is thus updated with the latest sampling data if stored sampling data exceeds capacity of memory 12. The flow then returns to step c4. Controller 13 thereafter repeats step c4 to step c9 until stored data counter i becomes equal to or more than stored data number Ns. If stored data counter i becomes equal to or more than stored data number Ns (N in step c4), controller 13 ends the processing.

Figure 7:
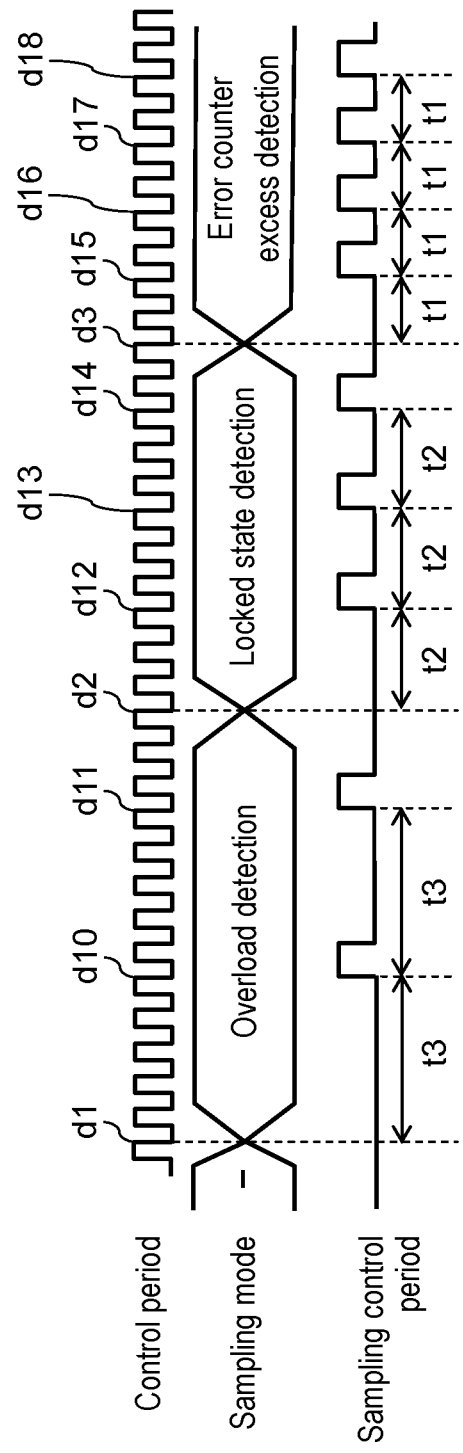
FIG. 7 is an exemplary view of the sampling data storage.
Figure 11:
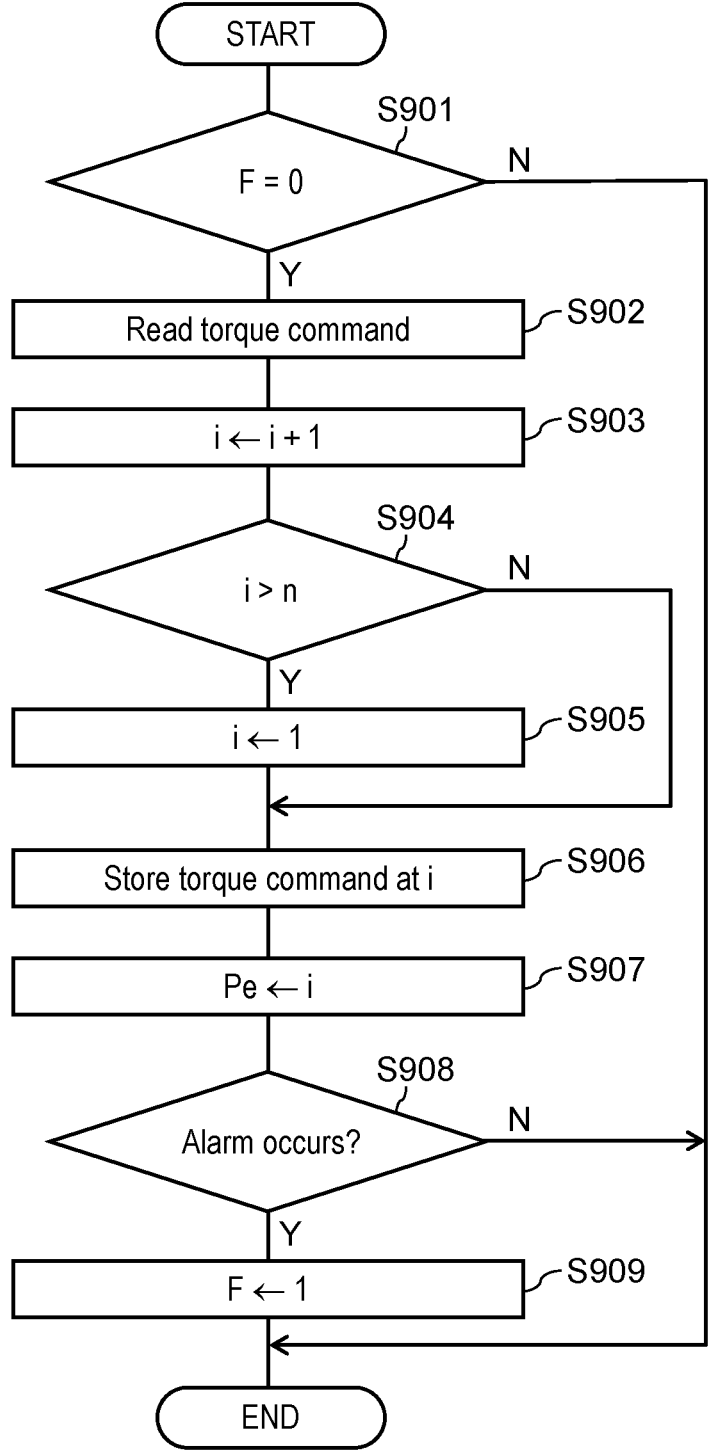
FIG. 11 is a schematic flowchart of conventional sampling data memorization.
Figures 12, 13:
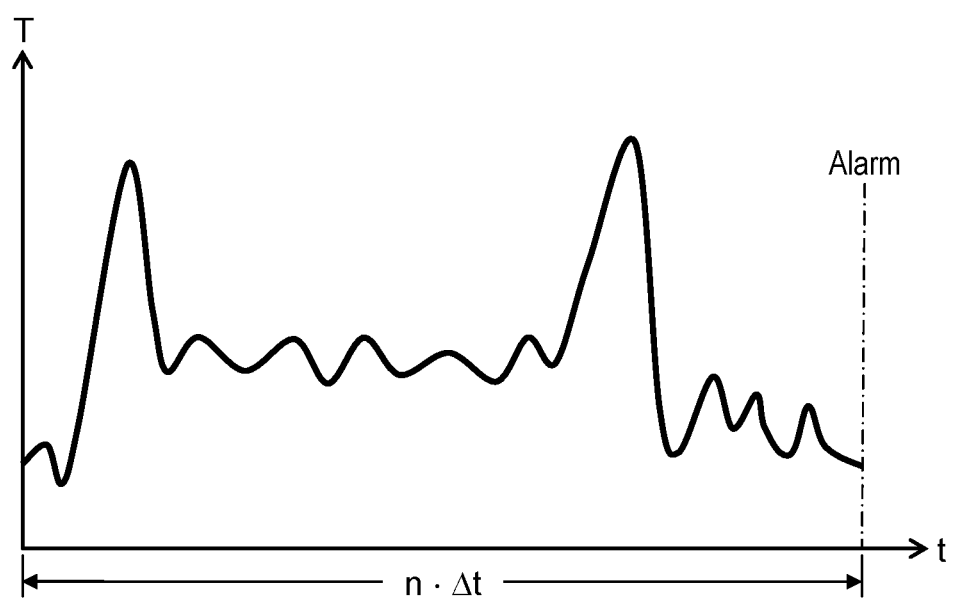
FIG. 12 is a conceptual chart depicting a configuration of a data memory file according to a conventional method of displaying a robot malfunction occurrence history.
FIG. 13 is an exemplary graph of data display according to the conventional method of displaying a robot malfunction occurrence history.

FIG. 7 is an exemplary view of the sampling data storage. FIG. 8 is a chart of exemplary sampling data stored during the overload detection. FIG. 9 is a chart of exemplary sampling data stored during lock detection. FIG. 10 is a chart of exemplary sampling data stored during the error counter excess detection.

First acquisition unit 10a, second acquisition unit 10b, and third acquisition unit 10c acquire data at every control period in FIG. 7. The control period has an exemplary interval of 2 msec. Specifically, first acquisition unit 10a acquires an error counter value of servomotor 4 at every control period. Second acquisition unit 10b acquires a speed feedback value of servomotor 4 at every control period. Third acquisition unit 10c acquires temperature of servomotor 4 at every control period. Controller 13 executes sampling mode determination as depicted in the flowchart of FIG. 2 at every control period. As depicted in FIG. 3 to FIG. 5, controller 13 updates a sampling data acquisition condition upon sampling mode change. Controller 13 stores sampling data in memory 12 as depicted in FIG. 6 in accordance with the updated sampling data acquisition condition.

Specific example of the stored sampling data will be described with reference to FIG. 7 to FIG. 10.

Controller 13 determines that the sampling mode is the overload detection at control period d1 in FIG. 7. Controller 13 then sets sampling period Ts to third period t3. Controller 13 stores sampling data A1 to An1 in memory 12 at control period d10 after third period t3 elapses from control period d1. Controller 13 stores sampling data A1 to An1 again in memory 12 at control period d11 after third period t3 elapses from control period d10 (see FIG. 8).

Controller 13 subsequently determines that the sampling mode is the locked state detection at control period d2 in FIG. 7. Controller 13 then sets sampling period Ts to second period t2. Controller 13 stores sampling data B1 to Bn2 in memory 12 at control period d12 after second period t2 elapses from control period d2. Controller 13 thereafter stores sampling data B1 to Bn2 in memory 12 at control period d13 and control period d14 after each second period t2 elapses from control period d12 (see FIG. 9).

Controller 13 subsequently determines that the sampling mode is the error counter excess detection at control period d3 in FIG. 7. Controller 13 then sets sampling period Ts to first period t1. Controller 13 stores sampling data C1 to Cn3 in memory 12 at control period d15 after first period t1 elapses from control period d3. Controller 13 thereafter stores sampling data C1 to Cn3 in memory 12 at control period d16, control period d17, and control period d18 after each first period t1 elapses from control period d15 (see FIG. 10).

As described above, data storage device 3 is configured to store data on malfunction of robot 20 with a sampling mode having a higher urgency degree being prioritized. Data storage device 3 is thus configured to efficiently store data on a plurality of malfunctions of robot 20.

First acquisition unit 10a, second acquisition unit 10b, third acquisition unit 10c, first determination unit 11a, second determination unit 11b, third determination unit 11c, and controller 13 described above are each configured by an integrated circuit or the like. Part or entirety of first acquisition unit 10a, second acquisition unit 10b, third acquisition unit 10c, first determination unit 11a, second determination unit 11b, third determination unit 11c, and controller 13 can alternatively be configured by a single integrated circuit. Each function of first acquisition unit 10a, second acquisition unit 10b, third acquisition unit 10c, first determination unit 11a, second determination unit 11b, third determination unit 11c, and controller 13 can be achieved by an integrated circuit and a program in cooperation with each other. In other words, each of first acquisition unit 10a, second acquisition unit 10b, third acquisition unit 10c, first determination unit 11a, second determination unit 11b, third determination unit 11c, and controller 13 can be configured by a microcontroller.

Data storage device 3 optionally excludes third acquisition unit 10c and third determination unit 11c. Data storage device 3 thus configured stores the first data on the first malfunction and the second data on the second malfunction.

INDUSTRIAL APPLICABILITY

The data storage device according to the present disclosure is configured to efficiently store data on a plurality of robot malfunctions even with a limit in memory capacity. The data storage device according to the present disclosure is useful for more accurate analysis of robot malfunction and industrially worthful.

REFERENCE MARKS IN THE DRAWINGS 1 display
2 robot control device
3 data storage device
4 servomotor (drive unit)
10a first acquisition unit
10b second acquisition unit
10c third acquisition unit
11a first determination unit
11b second determination unit
11c third determination unit
12 memory
13 controller
20 robot
30 robot system
S901 to S909 step
910 data memory file

The invention claimed is:

1. A data storage device configured to store data on malfunction of a robot, the data storage device comprising:
   a first acquisition unit configured to acquire first data on first malfunction of the robot;
   a second acquisition unit configured to acquire second data on second malfunction of the robot;
   a first determination unit configured to determine whether or not to store the first data in accordance with the first data;
   a second determination unit configured to determine whether or not to store the second data in accordance with the second data;
   a memory configured to store the first data and the second data; and
   a controller configured to
      store the first data in the memory at a first period when the first determination unit determines to store the first data, and
      store the second data in the memory at a second period longer than the first period, when the first determination unit determines not to store the first data and the second determination unit determines to store the second data.

2. A robot system comprising:
   the data storage device according to claim 1;
   the robot; and
   a robot control device; wherein
   the robot includes a drive unit, and
   the robot control device is configured to control the drive unit.

3. The robot system according to claim 2, wherein each of the first malfunction and the second malfunction relates to the drive unit.

4. The robot system according to claim 2, wherein the drive unit is a servomotor.

5. The robot system according to claim 2, further comprising a display configured to display at least one of the first data or the second data stored in the memory.

6. The robot system according to claim 2, wherein the robot control device is configured to stop the drive unit in accordance with at least one of the first data or the second data stored in the memory.

7. A data storage method of storing data on malfunction of a robot, the method comprising:
- acquiring first data on first malfunction of the robot;
- acquiring second data on second malfunction of the robot;
- determining whether or not to store the first data in accordance with the first data;
- determining whether or not to store the second data in accordance with the second data; and
- storing the first data at a first period upon determination to store the first data, and
- storing the second data at a second period longer than the first period, upon determination not to store the first data and determination to store the second data.

* * * * *